(12) United States Patent
Roy et al.

(10) Patent No.: US 11,560,834 B2
(45) Date of Patent: Jan. 24, 2023

(54) ELECTRIC CAMSHAFT PHASER MOTOR—GENERATOR

(71) Applicant: Schaeffler Technologies AG & Co. KG, Herzogenaurach (DE)

(72) Inventors: Ayushmoy Roy, Troy, MI (US); Steven Burke, Fort Gratiot, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 894 days.

(21) Appl. No.: 16/384,081

(22) Filed: Apr. 15, 2019

(65) Prior Publication Data
US 2020/0325818 A1  Oct. 15, 2020

(51) Int. Cl.
*F02B 63/04* (2006.01)
*F01L 1/344* (2006.01)
*H02K 7/00* (2006.01)
*H02K 11/00* (2016.01)
*H02K 11/04* (2016.01)
*H02K 7/075* (2006.01)
*F01L 1/352* (2006.01)
*F01L 1/46* (2006.01)
*F01L 13/00* (2006.01)
*F01L 1/047* (2006.01)

(52) U.S. Cl.
CPC ............ *F02B 63/042* (2013.01); *F01L 1/344* (2013.01); *F01L 1/352* (2013.01); *F01L 1/46* (2013.01); *H02K 7/006* (2013.01); *H02K 7/075* (2013.01); *H02K 11/0094* (2013.01); *H02K 11/046* (2013.01); *F01L 1/047* (2013.01); *F01L 2013/103* (2013.01); *F01L 2201/00* (2013.01); *F01L 2820/032* (2013.01)

(58) Field of Classification Search
CPC ... F01L 1/047; F01L 1/352; F01L 1/46; F01L 2013/103; F01L 2201/00; F01L 2820/032; H02K 7/006
USPC ........................................... 123/90.15, 90.17
See application file for complete search history.

(56) References Cited

U.S. PATENT DOCUMENTS

| 6,257,186 B1 | 7/2001 | Heer | |
|---|---|---|---|
| 6,724,165 B2 | 4/2004 | Hughes | |
| 10,151,222 B2 | 12/2018 | Burke et al. | |
| 2002/0092489 A1* | 7/2002 | Mikame | F01L 1/3442 123/90.17 |
| 2013/0008398 A1* | 1/2013 | Stoltz-Douchet | F01L 1/344 123/90.15 |
| 2018/0087411 A1* | 3/2018 | Burke | F01L 1/047 |
| 2018/0371963 A1 | 12/2018 | Burke et al. | |
| 2020/0080449 A1* | 3/2020 | McCloy | F01L 1/352 |

FOREIGN PATENT DOCUMENTS

JP     2016-044652 A     4/2016

* cited by examiner

Primary Examiner — Jorge L Leon, Jr.
(74) Attorney, Agent, or Firm — Volpe Koenig

(57) ABSTRACT

A cam phaser is described for selectively engaging in a torque transmitting mode or an angle control mode. In the torque transmitting mode, torque from a camshaft is transmitted to an e-motor, which functions as a generator and provides electrical energy.

15 Claims, 4 Drawing Sheets

ELECTRIC CAMSHAFT PHASER MOTOR—GENERATOR

FIELD OF INVENTION

The present invention relates to an electric camshaft phaser (ECP) with an energy recovery mode. The present disclosure also relates to a method for operating the ECP motor in two modes.

BACKGROUND

Camshaft phasers are provided within an internal combustion (IC) engine to control a camshaft angular position relative to a crankshaft angular position, ultimately phasing a valve event relative to a four-stroke engine cycle. Some ECP systems require a constant supply of electric power to an electric motor throughout IC engine operation, during both phasing and non-phasing instances. Therefore, fuel economy and emissions are negatively impacted.

The present disclosure is directed to overcoming this inefficiency and other problems of the prior art.

SUMMARY

In one aspect, the present disclosure is directed to a process of generating electrical energy for a vehicle. The process includes providing a cam phaser that has a control assembly and a motor assembly. The control assembly has a bolt non-rotatably connected to a camshaft of a vehicle. The process further includes connecting, non-rotatably, the control assembly to the motor assembly, transmitting torque from the camshaft to a rotor of the motor assembly to generate electrical energy, and storing the electrical energy in an energy storage component.

In a further aspect, the disclosure is directed to a process of operating a two-mode cam phaser for a vehicle. The process includes providing a cam phaser having a control assembly, a motor assembly, and an engagement feature. The control assembly includes a bolt non-rotatably connected to a camshaft of the vehicle, and the motor assembly includes a drive shaft. The process further includes, in a camshaft mode, phasing a vehicle gearbox in a camshaft to a desired cam angle. The process even further includes, in a camshaft locking mode, moving the engagement feature to non-rotatably connect the control assembly and the motor assembly, transmitting torque from the camshaft to the drive shaft of the motor assembly to generate electrical energy, and storing the electrical energy in a battery.

In another aspect, the disclosure is directed to a regenerative electrical supply system for a vehicle, including an engine having a pressurized hydraulic fluid supply, a camshaft, a cam phasing control assembly, and a hydraulic subassembly. The cam phasing control assembly has an electric motor with a drive shaft, an engagement feature, and a hydraulic displacement assembly for activating the engagement feature. The hydraulic subassembly selectively hydraulically connects the pressurized hydraulic fluid supply to the cam phasing control assembly, wherein for a camshaft locking mode the displacement assembly moves the engagement feature in a first axial direction to non-rotatably connect the drive shaft with the camshaft, and the electric motor is arranged to generate electrical energy from torque transferred from the camshaft. For a phase adjusting mode, the displacement assembly displaces the engagement feature in a second axial direction, opposite the first axial direction, to disconnect the drive shaft from the camshaft, and the camshaft is arranged to rotate with respect to an input gear.

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Figure 1:
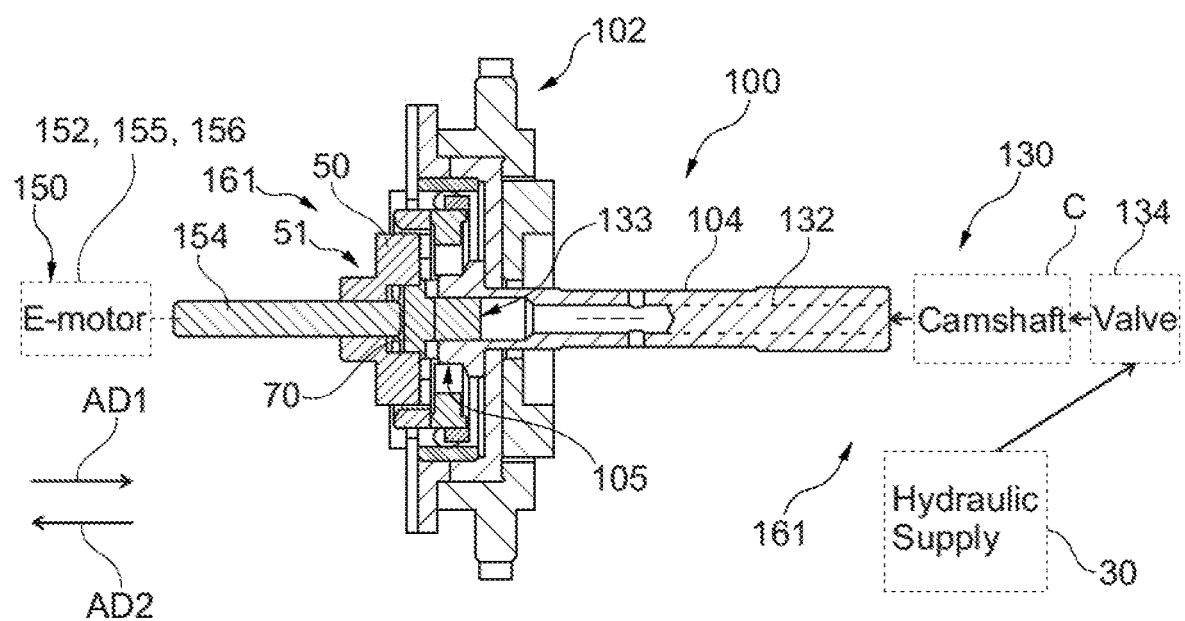
FIG. 1 is a cross-sectional view of a cam phasing control assembly for a cam phaser according to an embodiment of the present application, in a phase adjusting mode.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As used herein, the phrases "non-rotatably connected" or "non-rotatable" components mean that: the components are connected so that whenever one of the components rotates, all the components rotate; and relative rotation between the components is not possible. Radial and/or axial movement of non-rotatably connected components with respect to each other is possible, but not required. As used herein, one component "engaged with" another component means that: the one component is in direct contact with the other component or the components are in contact with a mechanically solid intermediary or ancillary part. For example, a washer or coating could be disposed between the two components.

Generally, a cam phaser applicable to the present application is used in conjunction with an engine, such as an internal combustion engine, in order to vary valve timing in a manner known in the art. An electric cam phaser (ECP) can include an electric motor that rotationally actuates a gearbox to facilitate phasing of a camshaft relative to a crankshaft. A cam phaser control assembly 100/200 of the present invention is applicable to ECPs as disclosed generally in U.S. patent application Ser. No. 15/631,787, the entire disclosure of which is incorporated herein as if fully set forth and for all purposes.

Figure 2:
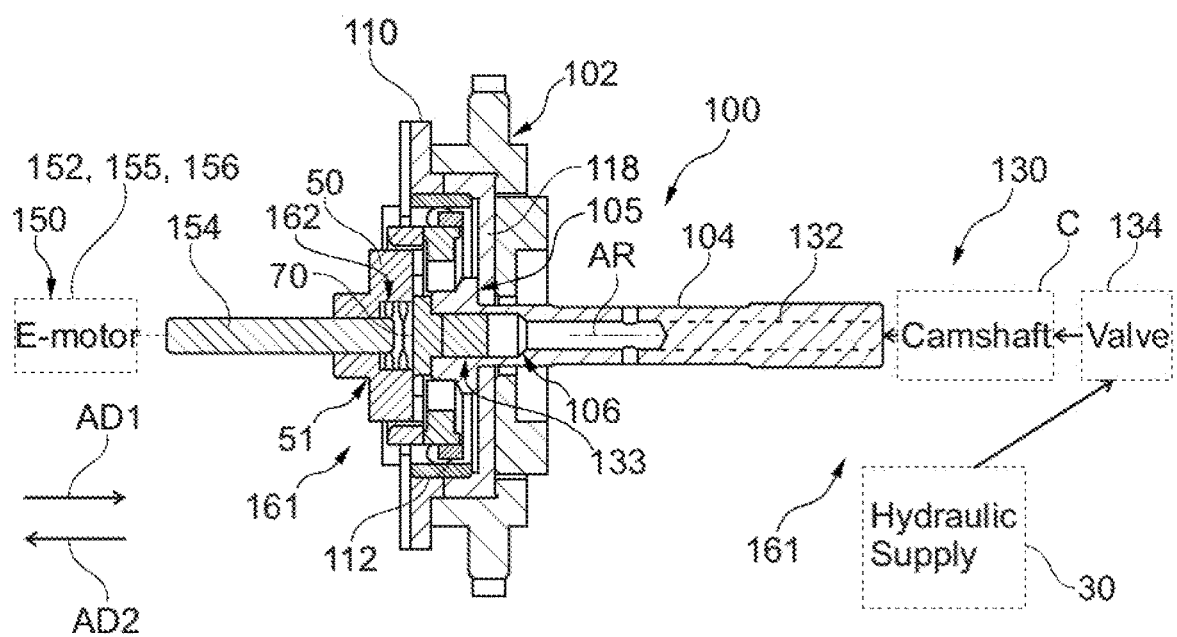
FIG. 2 is a cross-sectional view of the cam phasing control assembly of FIG. 2 in a camshaft locking mode.

FIGS. 1 and 2 illustrate a first embodiment of a cam phasing control assembly 100 for an ECP that includes a hydraulic subsystem 130. The assembly 100 includes a gearbox phasing unit 102 and a bolt 104. The bolt 104 is non-rotatably connected to a camshaft C. The bolt 104 may include a head 105 defining a recessed area 106 at a distal end thereof.

In this exemplary embodiment, the gearbox phasing unit 102 includes an input gear 110, a control gear/unit 112, and an output gear 118. One skilled in the art would recognize that the gearbox phasing unit 102 can be any radial gearbox phasing unit known in the art, such as a planetary gear unit, an elliptical gear unit, or a harmonic drive unit.

The hydraulic subsystem 130 is provided with the gearbox phasing unit 102 for providing power to selectively move a pin 133 within the bolt 104 in an axial direction AD1/AD2 for purposes discussed below. The hydraulic subsystem 130 includes a hydraulic chamber 132 formed through the bolt 104. The pin 133 is axially movable, under hydraulic power, within the hydraulic chamber 132. A valve 134, such as a solenoid valve, selectively permits hydraulic flow to the hydraulic chamber 132. A hydraulic supply 30 provides hydraulic power to the subsystem 130. The hydraulic supply may be, for example, drawn from a pressurized hydraulic fluid supply within the vehicle engine.

A paddle 50 and a drive element 70 (also referred to collectively as an engagement feature 51) are provided for selective engagement between the gearbox phasing unit 102 and a motor assembly 150 for cam phasing control, as discussed further below. In the illustrated embodiment, the paddle 50 is non-rotatably connected to a drive shaft 154 of the motor assembly 150. The drive element 70 is non-rotatably connected to the paddle 50 and selectively non-rotatably connected to the bolt 104 of the gearbox phasing unit 102, and therefore also selectively non-rotatably connected to the camshaft C. The pin 133 is configured to selectively push the drive element 70 into or out of engagement with the bolt head 105. A resilient element 162, such as a spring, may be provided to bias the drive element 70 and the pin 133 in direction AD1 to engage with the bolt head 105, as shown in FIG. 2.

The motor assembly 150 includes an electric motor 152 with a drive shaft 154. The electric motor includes a stator 155 and a rotor 156 (shown schematically in FIGS. 1-2; may be arranged similarly to stator 255 and rotor 256 in FIG. 8).

In the hydraulic-powered embodiment of FIGS. 1 and 2, when the valve 134 is open supplying hydraulic fluid to the chamber 132, the pin 133 is actuated by hydraulic fluid and moves the drive element 70 out of a head 105 of the center bolt 104.

FIG. 1 shows the cam phasing control assembly 100, including the gearbox phasing unit 102, in a phase adjusting mode with the center bolt 104 and the drive element 70 disengaged. FIG. 2 shows a camshaft locking mode with the paddle 50, the drive element 70, and the center bolt 104 engaged for a non-rotatable connection. During vehicle coasting when non-rotatably connected in this camshaft locking mode, the cam phasing control assembly 100 can provide regenerative electrical energy.

An ECP controller applicable to the present disclosure will require a control module able to functionally control the hydraulic fluid supply valve 134. Control of the valve 134 is based on two modes: a camshaft locking mode (FIGS. 2 and 7) with the valve 134 fully closed (and full engagement between the center bolt 104 and the drive element 70) allowing no hydraulic fluid flow, and a camshaft phasing mode (FIGS. 1 and 6) with the valve 134 fully open to allow full hydraulic fluid flow resulting in no engagement between the center bolt 104 and the drive element 70. The "locking" of the camshaft locking mode may be non-rotatable locking between the paddle 50, the drive element 70, and the center bolt 104 that mounts the gearbox onto the camshaft C. More generally, this "locking" may be considered torque transfer from the camshaft C to the drive shaft 154, or even more generally as torque transfer between the control assembly 100 and the motor assembly 150.

Figure 3:
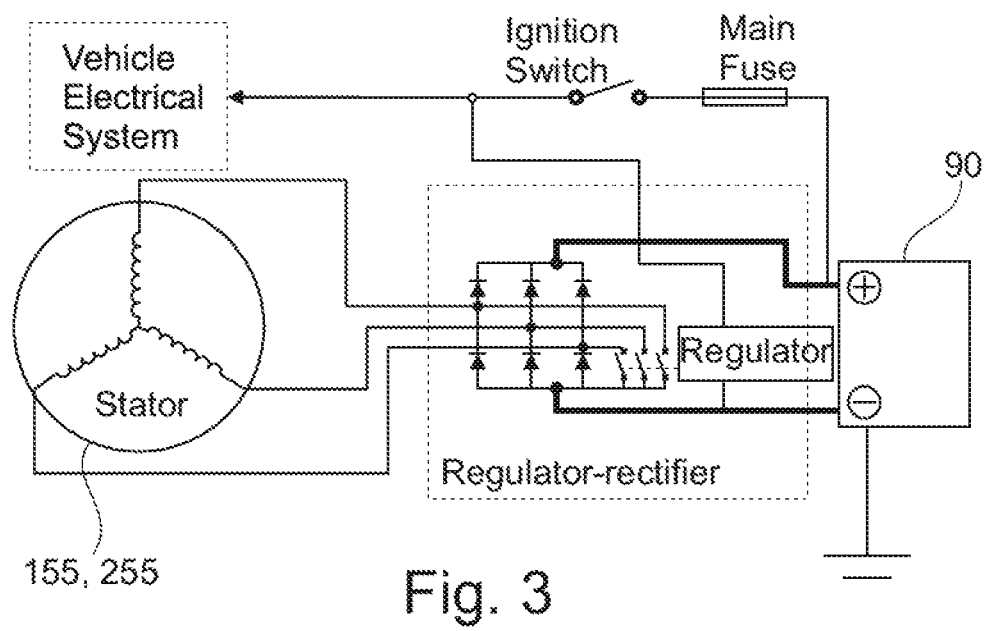
FIG. 3 is a block diagram of a vehicle including the cam phasing control assembly of FIG. 2.

Turning to FIG. 3, a block diagram is shown for a vehicle that includes the cam phasing control assembly to provide regenerative electrical power. One exemplary ECP electric motor applicable to the present disclosure is a permanent magnet brushless DC motor, although other motors may be used. One skilled in the art would recognize that when a current is passed through the coils of the stator 155/255, a magnetic field is generated and permanent magnets (e.g., permanent magnets 257 shown in FIG. 8) of the rotor 156/256 are attracted-and-repelled as per the commutation design of the motor 152/252 using three-phase control.

In this setup, when an external torque on the shaft 154 of the motor 152 turns the rotor 156, a back electromagnetic force (EMF) is generated through the stator coils and thus the electric motor 152 can be used as a generator to store the kinetic energy from rotation of the cam shaft C as electrical energy in an energy storage component (shown schematically in FIG. 3 as a battery 90). The energy storage component may be, for example, a battery 90, capacitor, or the like. When the rotor 156 is set in motion, an AC current is induced. The AC-current is led through a rectifier inside the regulator-rectifier-unit (shown schematically). The rectifier will convert the three AC-phases to a single dc output, a ground and a positive. To prevent overcharging and/or electrical damage, a regulator inside a regulator-rectifier will monitor the DC-voltage across the energy storage component (for example, monitor DC-voltage across battery terminals) and short-circuit a certain amount of power that is produced by the stator 155 to ground.

Figure 4:
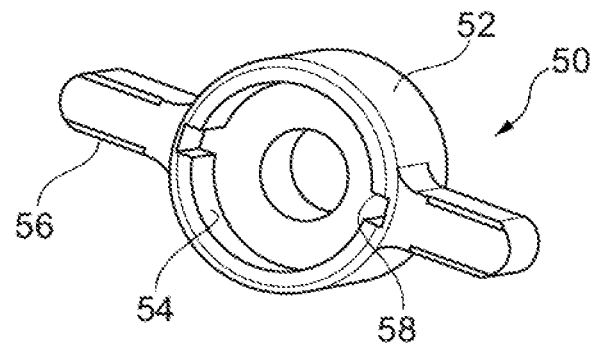
FIG. 4 is a perspective view of a paddle of the cam phasing control assembly of FIG. 1.
Figure 5:
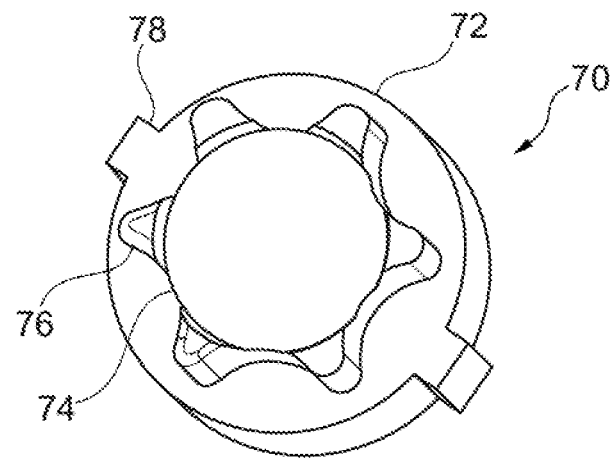
FIG. 5 is a perspective view of a drive element of the cam phasing control assembly of FIG. 1.

FIG. 4 shows the paddle 50 of the cam phasing control assembly 100 including a cylindrical base 52, a protrusion 54 including a plurality of spokes 56, and a pair of slots 58. FIG. 5 is a perspective view of a drive element 70 of the cam phasing control assembly 100 including a cylindrical body 72, recessed area 74, arms 76, and tabs 78. The paddle 50 and drive element 70 are configured to have complementary shapes to provide positive non-rotatable interlocking when engaged without undue slipping or knocking. For example, the tabs 78 may be sized to fit closely within the slots 58. The tab 78 and slot 58 configuration facilitates a non-rotatable connection between the paddle 50 and drive element 70 during axial movement of the drive element 70 to either engage or disengage the arms 76 of the drive element with or from recessed area 106 of the head 105 of the center bolt 104. This arrangement provides for the selective non-rotatable connection between the drive element 70 and the center bolt 104.

Figure 6:
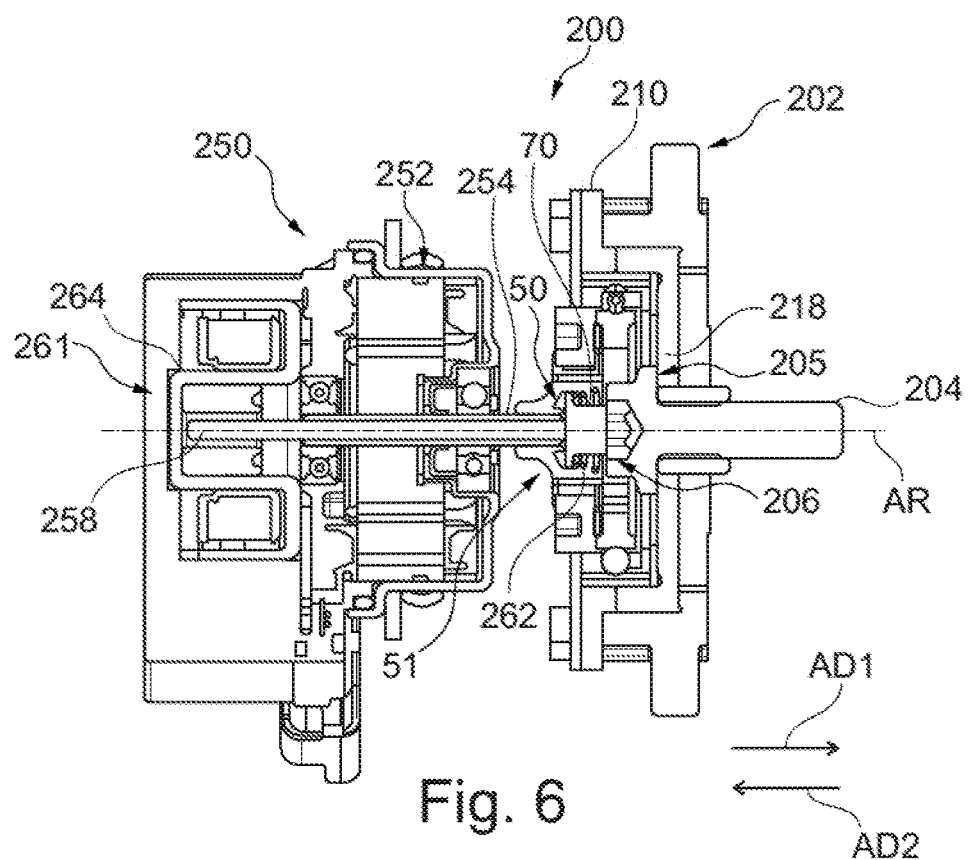
FIG. 6 is a cross-sectional view of another cam phasing control assembly for a cam phaser, in a phase adjusting mode.
Figure 7:
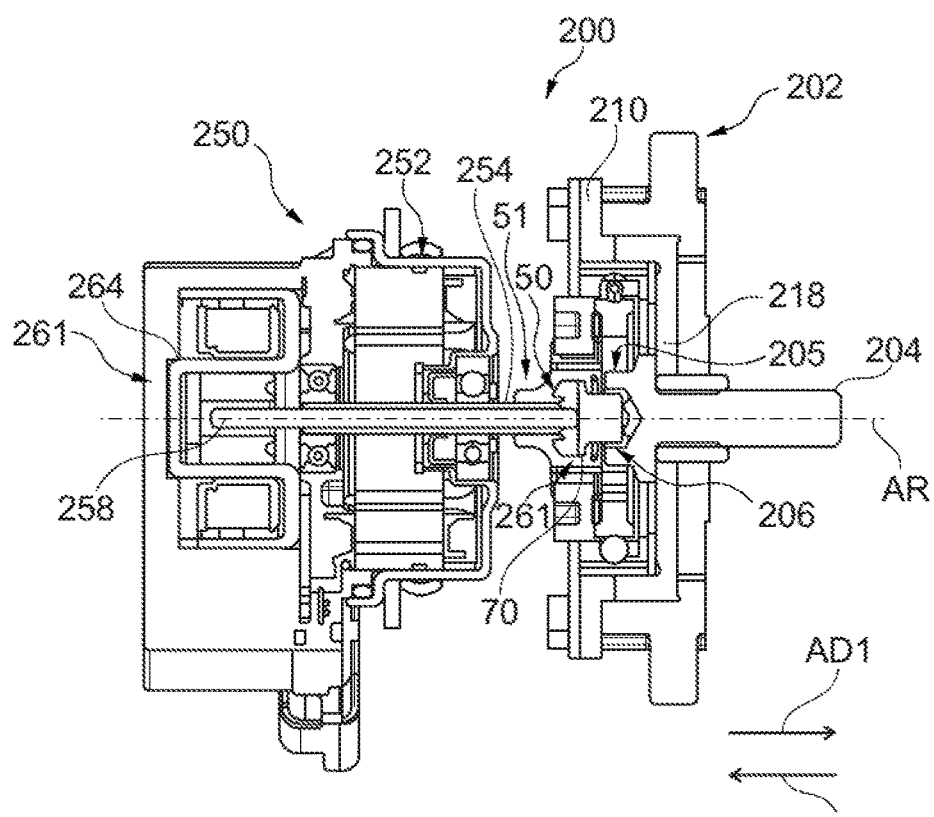
FIG. 7 is a cross-sectional view of the cam phasing control assembly of FIG. 6 in a camshaft locking mode.
Figure 8:
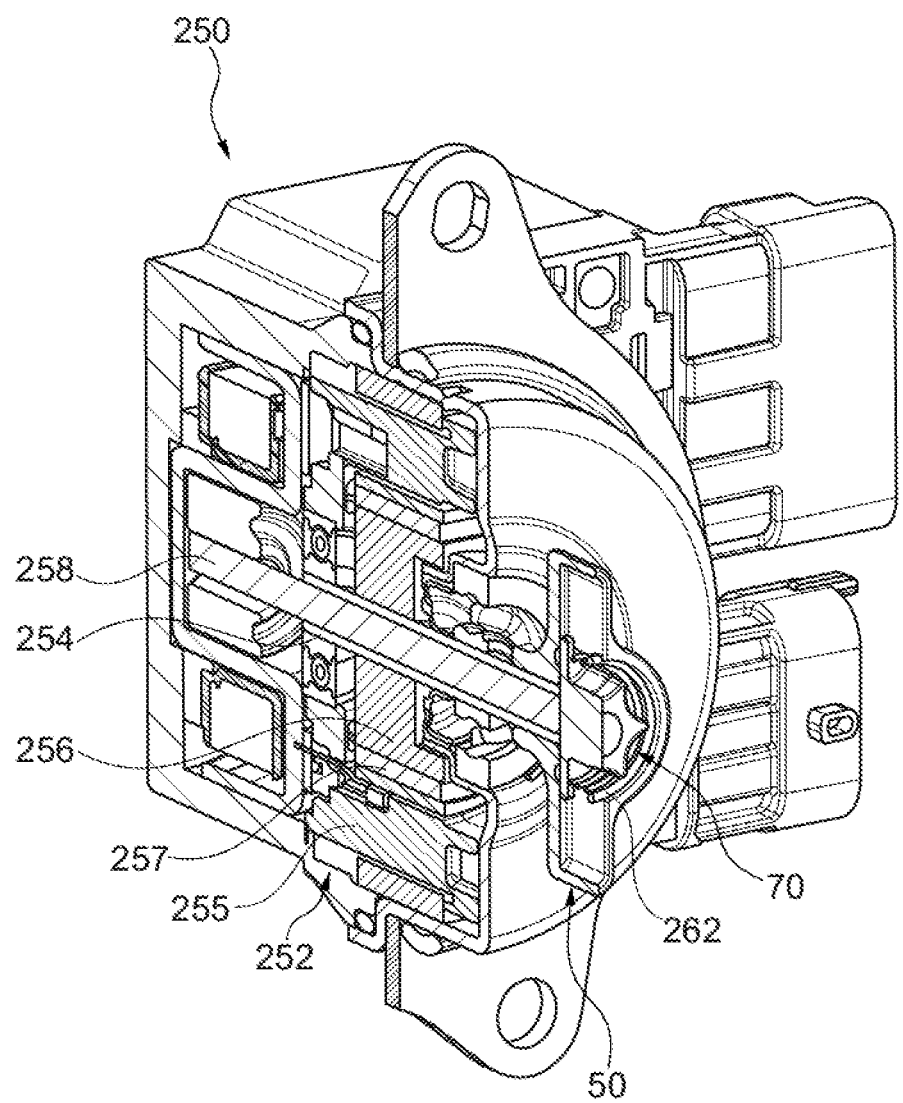
FIG. 8 is a perspective cross-sectional view of a motor assembly in the cam phasing control assembly of FIG. 7.

FIGS. 6-8 illustrate a second embodiment of a cam phasing control assembly 200 powered by an electric motor 252. In this embodiment, like parts are referred to with like reference numerals. Broadly speaking, the cam phasing control assembly 200 provides for similar selective engagement of the drive element 70, which is non-rotatably connected to the paddle 50, to the center bolt head 205, with the displacement assembly 261 axially moving an actuating pin 258 in direction AD1/AD2. As a result, the actuating pin 258 moves the drive element 70 into and out of engagement with the center bolt 204. A resilient element 262, such as a spring, may be provided to bias the drive element 70 in direction AD2 with the actuating pin 258 in a retracted position, as shown in FIG. 6.

The cam phasing control assembly 200 and gearbox phasing unit 202 of FIGS. 6-8 may be substantially similar to the control assembly 100 of the previous embodiment, except the bolt 204 is not provided with a hydraulic chamber because there is no hydraulic subsystem. As such, the control assembly and phasing unit 202 will not be discussed in further detail.

It should be noted that, generally, the hydraulic-actuated cam phasing control assembly 100 and the electromechanical-actuated cam phasing control assembly 200 may be considered to have a displacement assembly 161/261 with activation that is either hydraulic (via hydraulic subsystem 130) or electromechanical (via solenoid 264 with actuating pin 258). In either case, this displacement assembly 161/261 produces axial movement to selectively and non-rotatably engage the center bolt 104 with the drive element 70, resulting in the camshaft locking mode. Likewise the resilient element 262 can produce reverse axial movement that disengages the drive element 70 to return to the phasing mode.

In use, during a normal camshaft locking mode of the cam phasing control assembly 100, the drive element 70 is in an extended position engaging the head 105 of the center bolt 104, biased by the resilient element 162. In this position and mode, the drive shaft 154 of the electric motor 152 engages with the center bolt 104 via the paddle 50 and the drive element 70. This locks the electric motor 152 to the camshaft C with the electric motor 152 acting as a generator. In this manner, during vehicle "coasting" (e.g., no engine power being output to wheels), electrical energy is fed back into the vehicle system. This electrical energy may be fed back to an energy storage component 90 as mentioned above. If the energy storage component 90 is a battery, this battery 90 may be the main vehicle battery or a secondary battery.

In use, during a normal phasing mode of the cam phasing control assembly 200, the pin 258 is in a retracted position, biased by resilient element 262, allowing the electric motor 252 to provide rotational input to the gearbox phasing unit 102 and thus phasing the camshaft C. During vehicle "coasting" (e.g., no engine power being output to wheels), an ECP controller applicable to the present disclosure will facilitate activation of the solenoid 264 to push the pin 258 in direction AD1 to an extended position, allowing the drive shaft 254 of the electric motor 252 to engage with the center bolt 204 via the paddle 50 and the drive element 70. This locks the electric motor 252 to the camshaft C with the electric motor 252 acting as a generator as discussed above.

Having thus described the present invention in detail, it is to be appreciated and will be apparent to those skilled in the art that many physical changes, only a few of which are exemplified in the detailed description of the invention, could be made without altering the inventive concepts and principles embodied therein. In particular, the paddle 50 and the drive element 70 and components thereof could be replaced with similar structures, so long as they can be selectively engaged for non-rotatable connection. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

Parts List
30. Hydraulic Supply
50. Paddle
51. Engagement Feature
52. Base
54. Protrusion
56. Spokes
58. Slots
70. Drive Element
72. Body
74. Recessed Area
76. Arms
78. Tabs
90. Battery
100. Cam Phasing Control Assembly
102. Gearbox Phasing Unit
104. Bolt
105. Head
106. Recessed Area
110. Input Gear
112. Control Gear/Unit
118. Output Gear
130. Hydraulic Subsystem
132. Chamber
133. Pin
134. Valve
150. Motor Assembly
152. Electric Motor
154. Drive Shaft
155. Stator
156. Rotor
161. Displacement Assembly
162. Resilient Element
200. Cam Phasing Control Assembly
202. Gearbox Phasing Unit
204. Bolt
205. Head
206. Recess
210. Input Gear
218. Output Gear
250. Motor Assembly
252. Electric Motor
254. Drive Shaft
255. Stator
256. Rotor
257. Permanent Magnet
258. Actuating Pin
261. Displacement Assembly
262. Resilient Element
264. Solenoid
AR. Rotational Axis

What is claimed is:

1. A method of generating electrical energy for a vehicle, the method comprising:
   (i) providing a cam phaser including:
      a control assembly including a bolt fixed to a camshaft of the vehicle, and
      a motor assembly connected to the control assembly;
   (ii) connecting, the control assembly with the motor assembly so as to be rotationally coupled;
   (iii) transmitting torque from the camshaft to a rotor of the motor assembly via a non-rotatable connection between the camshaft and a drive shaft of the motor assembly, so as to generate electrical energy; and (iv) storing the electrical energy in an energy storage component.

2. The method of claim 1, wherein the cam phaser further includes an engagement feature for connecting the motor assembly to the control assembly, and step (ii) includes moving the engagement feature.

3. The method of claim 2, wherein the engagement feature includes a paddle non-rotatably connected to the motor assembly and a drive element non-rotatably connected to the paddle and selectively non-rotatably connected to the control assembly.

4. The method of claim 2, further including disconnecting the engagement feature to enable the cam phaser to phase a vehicle gearbox to a desired cam angle.

5. The method of claim 2, wherein the step of moving the engagement feature includes axially moving an actuating pin of the motor assembly under electromechanical power.

6. The method of claim 5, wherein the actuating pin is non-rotatably connected to the drive shaft of the motor assembly.

7. The method of claim 1, wherein step (ii) includes axially moving a pin within a hydraulic chamber of the bolt.

8. The method of claim 7, wherein hydraulic power is supplied to the hydraulic chamber by a pressurized hydraulic fluid from an engine of the vehicle.

9. The method of claim 7, wherein hydraulic fluid is selectively provided through a chamber within the bolt.

10. The method of claim 7, wherein hydraulic power is supplied by a hydraulic assembly including a valve, a chamber in the camshaft, and a chamber in the bolt.

11. The method of claim 1, wherein step (iii) occurs when an engine of the vehicle is running at greater than idle speed.

12. The method of claim 1, wherein step (iii) occurs when the vehicle is coasting such that electrical energy is generated while no engine power is being output to wheels of the vehicle.

13. The method of claim 1, wherein step (iii) occurs when an engine of the vehicle is running at all engine speeds.

14. A method of operating a two-mode cam phaser for a vehicle, the method comprising:
  providing a cam phaser including:
    a control assembly including a bolt fixed to a camshaft of the vehicle,
    a motor assembly having a drive shaft, and
    an engagement feature;
  in a camshaft phasing mode: phasing a vehicle gearbox to a desired cam angle; and
  in a camshaft locking mode:
    moving the engagement feature to connect the control assembly to the motor assembly so as to be rotationally coupled,
    transmitting torque from the camshaft to the drive shaft of the motor assembly via a non-rotatable connection between the camshaft and the drive shaft of the motor assembly to generate electrical energy, and
    storing the electrical energy in a battery.

15. A regenerative electrical supply system for a vehicle, the system comprising:
  an engine having a pressurized hydraulic fluid supply;
  a camshaft;
  a cam phasing control assembly including:
    an electric motor with a drive shaft,
    an engagement feature, and
    a hydraulic displacement assembly for activating the engagement feature; and
  a hydraulic subassembly that selectively hydraulically connects the pressurized hydraulic fluid supply to the cam phasing control assembly, wherein:
    for a camshaft locking mode:
      the displacement assembly moves the engagement feature in a first axial direction to non-rotatably connect the drive shaft with the camshaft, and
      the electric motor is arranged to generate electrical energy from torque transferred from the camshaft via a non-rotatable connection between the camshaft and the drive shaft; and
    for a phase adjusting mode:
      the displacement assembly moves the engagement feature in a second axial direction, opposite the first axial direction, to disconnect the drive shaft from the camshaft, and,
    the camshaft is arranged to rotate with respect to a crankshaft input.

* * * * *